Sept. 20, 1966  J. F. KULP, JR  3,274,301
SPIN CASTING PARABOLOIDAL SURFACES
Filed Oct. 1, 1962

INVENTOR.
JOHN F. KULP, JR.
BY R H Quist
ATTORNEY

United States Patent Office 3,274,301
Patented Sept. 20, 1966

3,274,301
SPIN CASTING PARABOLOIDAL SURFACES
John F. Kulp, Jr., Malvern, Pa., assignor to General Electric Company, a corporation of New York
Filed Oct. 1, 1962, Ser. No. 227,182
5 Claims. (Cl. 264—1)

This invention relates to the production of paraboloidal surfaces by the technique of spin casting and more specifically to improved methods and formulations for achieving optically accurate paraboloidal surfaces.

As a part of a large space simulator being constructed near Valley Forge, Pennsylvania, it was desired to incorporate solar radiation simulation. The light sources themselves were to be positioned outside the simulator chamber with their light being reflected into the chamber to large collimating mirrors which would then project collimated light in a 22-foot diameter beam down onto whatever object was being tested.

The optical arrangement required that each collimating mirror be a paraboloidal surface representing a portion of a 35-foot diameter paraboloid having a focal length of 19 feet. Unfortunately, no source for a paraboloidal surface of such large dimensions existed, so it became necessary to construct it.

Spin casting was chosen as the technique to be used. The basic process is known in the prior art and shown in such references as U.S. Patent 2,972,782, issued to Paul B. Archibald. That patent, however, discloses the use of heating lamps to achieve a curing temperature of about 80° C. It was not feasible to provide even heating for a mold of the large size needed in this case, and the formulations recommended in the prior art failed to yield surfaces of a satisfactory quality. As a result, a new formulation and method for spin casting had to be devised.

It is, therefore, an object of this invention to provide an improved method and formulation for fabricating paraboloidal surfaces of high quality.

It is also an object of this invention to provide such a method which may be carried out at ordinary room temperatures.

In carrying out the invention in one form, a turntable capable of maintaining a substantially constant desired rotational velocity is placed on a rigid base. An open topped container or casting mold is mounted on this turntable. The casting mold may be designed to conform roughly with the desired configuration of the surface to be formed although a flat bottomed mold may be used. Into the center of the container is poured a particular epoxy resin formulation. A cover is then sealed over the top of the container and the turntable is brought to the speed required to achieve the desired paraboloidal surface. The resin mixture flows from the center of the container towards the outer edges until an equilibrium condition is reached and a paraboloidal surface has been generated. Although the resin formulation may still flow somewhat, it will be found that the surface remains smooth. As time passes, the constituents of the resin formulation react with each other and the formulation hardens. When this hardening or curing process has proceeded long enough the paraboloidal surface will remain even when the turntable is stopped.

For many purposes, the epoxy paraboloid itself will be used only as a female mold upon which a metal master mold will be electroformed. With this metal master mold, multiple paraboloidal surfaces can be formed.

A particular formulation which has been found to yield surfaces substantially free of flaws comprises: 100 parts of resin, made up of 80 parts of an epoxide resin as Ciba 506 and 20 parts of a flexibilizer such as Cardolite NC513; 17 parts per hundred parts of resin of a hardener such as diethylaminopropylamine; and 7 parts per hundred of resin of a filler such as silicon dioxide.

The invention will be better understood from the following description taken in connection with the accompanying drawing in which.

Figure 1:
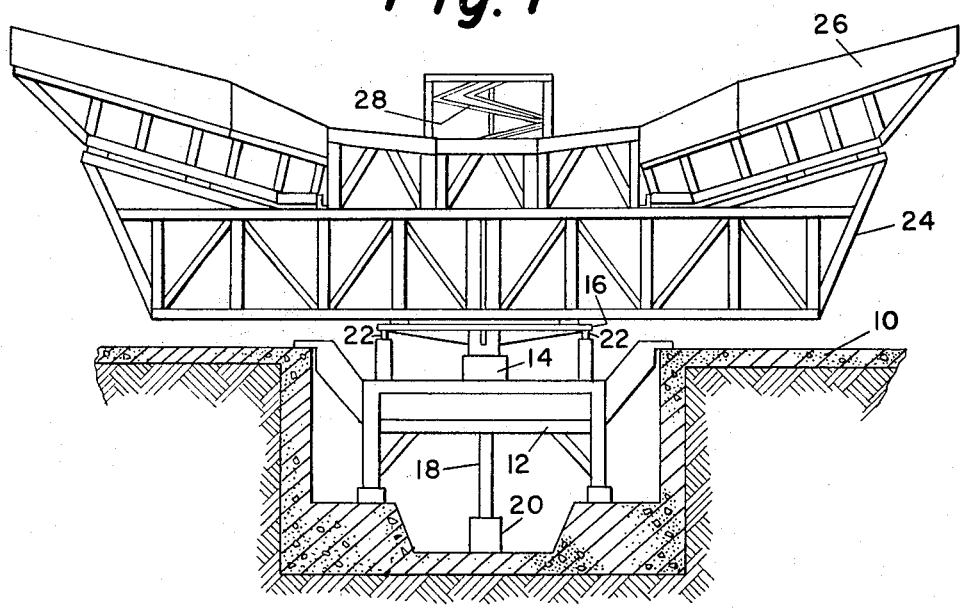
FIGURE 1 is a schematic elevation, partially in cross-section, of spin casting apparatus used in carrying out the invention.

Referring to FIGURE 1, the apparatus utilized in the spin casting technique will be described. Mounted in a pit in the floor 10 is a rigid supporting structure 12 which in this case is filled with a large mass of concrete. A thrust bearing 14 rests on structure 12 and in turn supports turntable 16. The shaft 18 which turns turntable 16 is driven by a motor 20 positioned below structure 12. Turntable 16 is given additional support by the provision of roller bearings 22 spaced about the periphery of the turntable.

Mold support structure 24 is constructed so that a rigid support for casting mold 26 will be provided on turntable 16. Mold 26 is designed to have a bottom configuration approximating that of the paraboloidal surface to be made. Although it would be possible to start with a flat bottomed mold, it is evident that a thick layer of resin would have to be built up near the outer edges. It has been found that better results are achieved if only a thin layer of resin is cast at one time. In order to avoid the slow process of building up a thick layer by using many thin layers of resin, mold 26 was built as shown.

For the paraboloidal surface which was cast in this case, about 55 gallons of resin formulation was required. An effort was made to avoid the formation of air bubbles in the pouring of the formulation into mold 26 by providing a chute 28 near the center of mold 26. The entire mixture was poured in this area since the rotation of mold 26 provides the necessary distribution.

The formulation used contains resins, a hardener, and a filler. During curing, the hardener tends to leave the surface of the material before it leaves the underlying portions. In this situation, the underlying material tends to harden first and surface faults develop as the surface cures. To prevent this from occurring, in accordance with this invention, the top of the mold is sealed with a substantially imperforate cover. As a result, it is hypothesized that an atmosphere rich in hardener develops over the surface of the material and prevents further depletion of hardener from the curing material. Curing then proceeds at a more even rate throughout the material and surface defects do not form. In the particular mold used here, the cover was stretched directly across the mold, but if a deep paraboloid was being cast, a cover conforming somewhat to the surface configuration should be used to prevent the formation of too large a volume over the surface area. As an alternative to this method, it is possible to artificially provide an atmosphere rich in hardener, for example by spraying hardener in the air surrounding the mold, but the use of a sealing cover is thought to be a more convenient method of achieving the desired result for most purposes.

Early in the work done on this invention, a satisfactory smaller surface had been cast, but later a different building was selected to do the casting of the larger surface. Difficulty was had in reproducing a suitable surface in this location so that a program of examining each component of the formulation and each step in the method was followed. From this program a broad knowledge was obtained as to which elements were vitally important to achieve a satisfactory surface and which presented no particular problems.

A suitable formulation for spin casting epoxy paraboloids comprises: 100 parts of resin composed of 65 to 95 parts by weight of an epoxide resin with the remaining parts being a flexibilizer; 12 to 20 parts per hundred parts of resin of a hardener; and 4 to 10 parts per hundred of resin of a filler. The epoxide resins which were used were Ciba 506 and Shell 820 (either one being satisfactory). In addition to these, Ciba 6005, 6020 and 502, as well as Shell 815 and 828, can be used. The generic chemical description of applicable resins is that they are the reaction product of one or more mols of diphenylol propane and one or more mols epichlorohydrin, the product being used as such or with the addition of reactive diluents such as phenyl glycidyl ether, or allyl glycidyl ether. They have an epoxide equivalent weight between 160 and 210; and a viscosity range at room temperature from 1000 to 5000 centipoises. The characteristic to be sought in a selection of the epoxide resin is a low viscosity at room temperature or the temperature at which the work is being done. The flexibilizer was an epoxidised cashew nut oil, marketed commercially under the designation "Cardolite NC513". Possible alternatives for the epoxidised cashew nut oil would be polysulfide elastomers. It is also possible to eliminate the use of a flexibilizer altogether if a resin is selected which is inherently flexible. Polyurethane resins would apparently be satisfactory for this approach, although they have not as yet been used. Diethylaminopropylamine was used as the hardener. Other hardeners which have been worked with include diethylenetriamine, triethylenetetraamine, and benzyldimethylamine. Again, hardeners which will perform their function at room temperature were sought for this formulation. As a filler, silicon dioxide (325 mesh) was used, although other fillers such as aluminum oxide, titanium oxide, diatomaceous earth and calcium carbonate of the same fineness can be substituted.

In addition to the foregoing components, 0.1 part per hundred of resin of Spirit Jet Nigrosin Dye was added. This dye is not believed to have had any effect on the surface smoothness or strength of the resulting female epoxy mold, but merely colored the material so that light would be reflected in the optical inspection of the epoxy mold.

The formulation which was used has the advantage that the mixing of the components is not critical to the casting of high quality epoxy molds as long as reasonable care is used. An Eppenbach Hom-Mixer was used with excellent results.

Environment can be an important factor if particularly adverse conditions exist such as high carbon dioxide concentrations or extreme temperatures. If the air has about 65% relative humidity and the temperature is about 72° F., no problems should develop because of environment. Lower temperatures extend the time needed for curing, while higher temperatures speed the curing process and tend to increase the mechanical strength of the epoxy mold.

The thickness of the epoxy layer cast should normally be held to a maximum of 5/8 inch. Since the curing process is exothermic, too high a temperature results if thicker layers are cast and distortions may result. Where multiple layers are cast, it is recommended that the final layer be made 1/4 inch or thinner.

One factor which should be emphasized is cleanliness. Dust or metal chips if present in the casting mold are likely to result in surface flaws. The requirement for cleanliness can be satisfied by casting a thin layer of resin in the mold after it has been cleaned as well as possible. This layer "locks" in the dust, giving a clean surface to cast on. It should be evident that the materials used in the formulation should also be free of foreign matter.

With the formulation poured in the casting mold and the cover sealed over the opening, the motor is started and brought to the speed selected. The speed to be used is dependent upon the focal length of the paraboloidal surface desired according to the formula:

$$f = \frac{g}{2\omega^2}$$

where the focal length is in feet, the gravitational acceleration constant is in feet/sec.$^2$, and the rotational velocity is in radians/sec.

This formula may be developed by considering the forces acting on the liquid. A body of liquid lying at rest with respect to the earth will form a surface normal to the force of gravity acting upon it. In the same manner, if a liquid is held in a container which is rotated about a vertical axis, a surface will be formed which is everywhere normal to the resultant force acting on each surface element.

Figure 2:
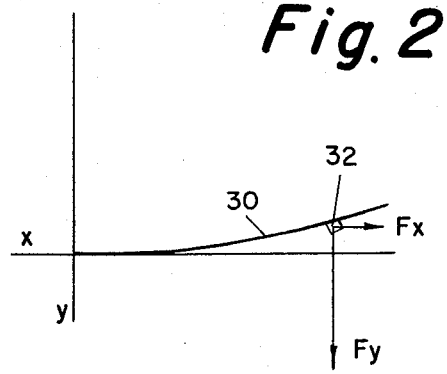
FIGURE 2 is a representation of the forces exerted on an element of liquid being rotated.

In FIGURE 2, a liquid surface 30 is represented, which has been formed by rotating a body of liquid about the $y$ axis at a constant rotational speed ($\omega$). An elemental volume ($dv$) is indicated at 32, a distance $x$ from the $y$ axis.

A force $F_y$ is being exerted upon element 32 which is equal to its mass ($\rho dv$), multiplied by the force of gravity ($g$) at the location of the liquid, or:

$$F_y = \rho dv g$$

In addition, the rotation produces a force $F_x$ which is equal to its mass multiplied by the square of the rotational velocity ($\omega^2$) and its distance from the $y$ axis, or:

$$F_x = \rho dv \omega^2 x$$

The slope of the surface of volume 32 will be normal to the resultant force acting upon it, or:

$$\frac{dy}{dx} = \frac{\rho dv \omega^2 x}{\rho dv g} = \frac{\omega^2 x}{g}$$

Integrating:

$$y = \frac{\omega^2 x^2}{2g} + C_1$$

which is equivalent to:

$$x^2 = \frac{2gy}{\omega^2} + C_2$$

The equation of a parabola in terms of its focal length ($f$) is:

$$x^2 = 4fy$$

It is evident that the derived equation is also that a parabola. The $x$ value will be zero when the $y$ value is zero if the parabola has its vertex at the origin. $C_2$ can therefore be made zero. Therefore:

$$4fy = \frac{2gy}{\omega^2}$$

and $$f = \frac{g}{2\omega^2}$$

After rotating for about 36 hours, the epoxy mold is cured to the extent that further rotation is unnecessary. The curing will continue, but the surface is fixed. A convenient way to follow the progress of the curing is to cast small samples of the same formulation at the time the large mold is cast.

Figure 3:
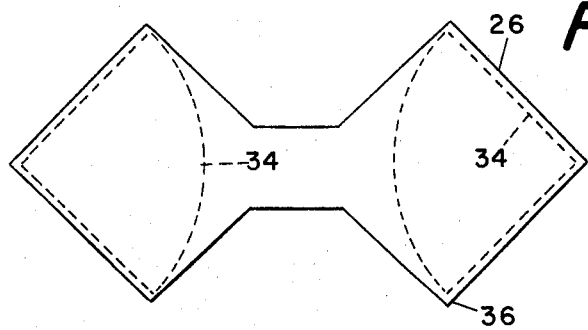
FIGURE 3 is a plan view of a mold used in carrying out the invention.

In FIGURE 3, a plan view of the epoxy mold which was made is shown. The paraboloidal surface sections which were desired are indicated by the dashed lines 34. The casting mold 26 was made large enough to leave a margin around sections 34 so that any distortions introduced by the flow of the formulation near corners such as 36 could be cut out. In retrospect, it is believed that by rounding these corners, all distortion could have been eliminated.

Naturally, the casting of a large mold such as this introduced problems which would not occur if a smaller mold were being cast. For example, it was necessary to have a long (6 or 7 hours) pot life, i.e., the formulation had to remain fluid long enough to be mixed and to flow over the entire mold before it would being to coagulate. By the same token, solving the problems which arose with a large mold makes the casting of a small mold a relatively easy task.

The optical accuracy which has been achieved using the formulations and methods of this invention can be described in the following terms. A surface smoothness of below two microinch finish (R.M.S.), a focal length accuracy of closer than ±0.1 of one percent, and paraboloidal surface tangents of less than 1–1½ minutes of arc have been attained over 95 percent of the surface area. It is expected that subsequent molds will be even better since experience has indicated how to avoid detrimental factors which could have been introduced.

While the particular formulation has been described in detail, it is evident that changes in quantities and substitution of equivalent constituents can be made without departing from the spirit of the invention and the scope of the appended claims.

What is claimed as new and desired to be secured by Letters Patent of the United States is:

1. A method for producing a cast paraboloidal surface comprising:
   depositing a liquid resin formulation in an open topped container;
   said resin formulation including a volatile hardener;
   maintaining above the surface of said resin formulation an atmosphere rich in said hardener; and
   rotating said container at a substantially constant speed about a vertical axis while said resin formulation is permitted to cure.

2. A method for producing a cast paraboloidal surface comprising:
   depositing a liquid room temperature curable resin formulation in an open topped container;
   said resin formulation including a volatile hardener;
   maintaining above the surface of said resin formulation an atmosphere rich in said hardener; and
   rotating said container at a substantially constant speed about a vertical axis while said resin formulation is permitted to cure.

3. A method for producing a cast paraboloidal surface comprising:
   depositing a liquid resin formulation in an open topped container;
   said resin formulation comprising:
      (a) 100 parts by weight of resin consisting of:
         (1) 65 to 95 parts of an epoxide resin, and
         (2) the remaining 35 to 5 parts of a flexiblizer,
      (b) 12 to 20 parts per hundred of resin of a hardener, and
      (c) 4 to 10 parts per hundred of resin of a filler;
   maintaining above the surface of said resin formulation an atmosphere rich in said hardener; and
   rotating said container at a substantially constant speed about a vertical axis while said resin formulation is permitted to cure.

4. A method for producing a cast paraboloidal surface comprising:
   depositing a liquid resin formulation in an open topped container;
   said resin formulation comprising:
      (a) 100 parts by weight of resin consisting of:
         (1) 65 to 95 parts of an epoxide resin, and
         (2) the remaining 35 to 5 parts of a flexibilizer,
      (b) 12 to 20 parts per hundred of resin of a hardener, and
      (c) 4 to 10 parts per hundred of resin of a filler;
   sealing said container with a substantially imperforate cover; and
   rotating said container at a substantially constant speed about a vertical axis while said resin formulation is permitted to cure.

5. A method for producing a cast paraboloidal surface comprising:
   depositing a liquid resin formulation in an open topped container;
   said resin formulation comprising:
      (a) 100 parts by weight of a polyurethane resin;
      (b) 12 to 20 parts per hundred of resin of a hardener, and
      (c) 4 to 10 parts per hundred of resin of a filler;
   maintaining above the surface of said resin formulation an atmosphere rich in said hardener; and
   rotating said container at a substantially constant speed about a vertical axis while said resin formulation is permitted to cure.

References Cited by the Examiner

UNITED STATES PATENTS

| | | | |
|---|---|---|---|
| 1,146,384 | 7/1915 | Aylsworth | 264—82 |
| 2,972,782 | 2/1961 | Archibald | 264—311 |
| 3,010,153 | 11/1961 | Bittner | 264—311 XR |

FOREIGN PATENTS

| | | |
|---|---|---|
| 19,325 | 9/1898 | Great Britain. |

ROBERT F. WHITE, *Primary Examiner.*

ALEXANDER H. BRODMERKEL, *Examiner.*

J. R. DUNCAN, S. A. HELLER, *Assistant Examiners.*